(12) United States Patent
Swartzlander, Jr. et al.

(10) Patent No.: US 9,317,478 B2
(45) Date of Patent: Apr. 19, 2016

(54) DUAL-PATH FUSED FLOATING-POINT ADD-SUBTRACT

(75) Inventors: Earl E. Swartzlander, Jr., Austin, TX (US); Jongwook Sohn, Austin, TX (US)

(73) Assignee: Crossfield Technology LLC, Austin, TX (US)

(*) Notice: Subject to any disclaimer, the term of this patent is extended or adjusted under 35 U.S.C. 154(b) by 581 days.

(21) Appl. No.: 13/609,224

(22) Filed: Sep. 10, 2012

(65) Prior Publication Data
US 2014/0074903 A1    Mar. 13, 2014

(51) Int. Cl.
*G06F 17/10* (2006.01)
*G06F 7/485* (2006.01)

(52) U.S. Cl.
CPC .............. *G06F 17/10* (2013.01); *G06F 7/485* (2013.01); *G06F 2207/3884* (2013.01)

(58) Field of Classification Search
CPC ....................................................... G06F 7/485
USPC ......................................................... 708/505
See application file for complete search history.

(56) References Cited

U.S. PATENT DOCUMENTS

| | | | | |
|---|---|---|---|---|
| 5,790,445 A * | 8/1998 | Eisen et al. | ................... | 708/505 |
| 6,397,239 B2 * | 5/2002 | Oberman et al. | ............. | 708/505 |
| 2003/0055859 A1 * | 3/2003 | Seidel et al. | .................. | 708/505 |
| 2006/0036667 A1 * | 2/2006 | Srivastava | ..................... | 708/505 |
| 2006/0206556 A1 * | 9/2006 | Lutz et al. | ..................... | 708/700 |
| 2010/0146022 A1 * | 6/2010 | Swartzlander et al. | ....... | 708/209 |

* cited by examiner

*Primary Examiner* — Chuong D Ngo
(74) *Attorney, Agent, or Firm* — R. Michael Reed; Cesari & Reed LLP

(57) ABSTRACT

A fused floating-point add-subtract unit includes far path logic, close path logic, and selection logic. The far path logic is configured to perform addition and subtraction operations on first and second significands of first and second operands, respectively, to produce a far path sum and a far path difference. The close path logic is configured to perform addition and subtraction operations on the first and second significands of the first and second operands, substantially concurrently with the addition and subtraction operations of the far path logic, to produce a close path sum and a close path difference. The selection logic selectively provides one of the far path sum and the close path sum as a significand of a sum output and one of the far path difference and the close path difference as a significand of a difference output.

18 Claims, 10 Drawing Sheets

DUAL-PATH FUSED FLOATING-POINT ADD-SUBTRACT

FIELD

The present disclosure is generally related to floating-point arithmetic units, and more particularly to a fused floating-point add-subtract unit incorporating far path logic and close path logic to provide dual paths for reducing latency in computing a sum and difference of two floating-point operands.

BACKGROUND

As computing systems become increasingly sophisticated, digital signal processing (DSP) systems are making the transition from fixed-point arithmetic to floating-point arithmetic, which provides freedom from overflow and underflow and which simplifies interfacing to the rest of the computing system. Such computing systems typically use the Institute of Electrical and Electronics Engineers (IEEE) 754-Standard Floating-Point Arithmetic, which supports multiple rounding modes.

One type of unit that can perform both add and subtract operations simultaneously is a fused add-subtract floating-point unit, such as the unit described in U.S. Pat. No. 8,161,090, issued to Swartzlander, et al. on Apr. 17, 2012, which is incorporated herein by reference in its entirety. Such fused add-subtract floating-point units reduce circuit area and power consumption as compared to discrete floating-point implementations.

SUMMARY

In an embodiment, a fused floating-point add-subtract unit includes far path logic, close path logic, and selection logic. The far path logic is configured to perform addition and subtraction operations on first and second significands of first and second operands, respectively, to produce a far path sum and a far path difference. The close path logic is configured to perform addition and subtraction operations on the first and second significands of the first and second operands, substantially concurrently with the addition and subtraction operations of the far path logic, to produce a close path sum and a close path difference. The selection logic selectively provides one of the far path sum and the close path sum as a significand of a sum output and one of the far path difference and the close path difference as a significand of a difference output.

In another embodiment, a method includes receiving first and second operands at a floating-point fused add-subtract circuit including close path logic and far path logic. The method further includes simultaneously performing add and subtract operations on the first and second operands using the far path logic to produce a first sum and difference and using the close path logic to produce a second sum and difference. The method also includes determining a difference between exponents of the first and second operands and selectively providing one of the far path sum and the close path sum to a first output and one of the far path difference and the close path difference to a second output in response to determining the difference.

In still another embodiment, a fused floating-point add-subtract unit includes exponent comparison logic to determine a difference between a first exponent of a first operand and a second exponent of a second operand. The fused floating-point add-subtract unit further includes far path logic and close path logic. The far path logic is configured to simultaneously perform add and subtract operations on the significands of the first and second operands to produce a far path sum and a far path difference when the difference is greater than one. The close path logic is configured to simultaneously add and subtract operations on the significands of the first and second operands to produce a close path sum and a close path difference when the difference is less than or equal to one.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

The present disclosure introduces improved architectures for a fused floating-point add-subtract unit, which can be useful for digital signal processing (DSP) applications such as fast Fourier transform (FFT) and discrete cosine transform (DCT) butterfly operations. To improve the performance of the fused floating-point add-subtract unit, a fused floating-point add-subtract unit incorporates far path logic and close path logic to determine, based on the exponents of the operands, how much (if any) the smaller of the operands needs to be shifted relative to the larger of the operands in order to efficiently perform the add and subtract operations simultaneously. In some embodiments, the dual paths are pipelined to provide enhanced throughput. Embodiments described below can be implemented for both single and double precision and can be synthesized with a 45-nm standard-cell library. In the following discussion, single precision is used.

Figure 1:
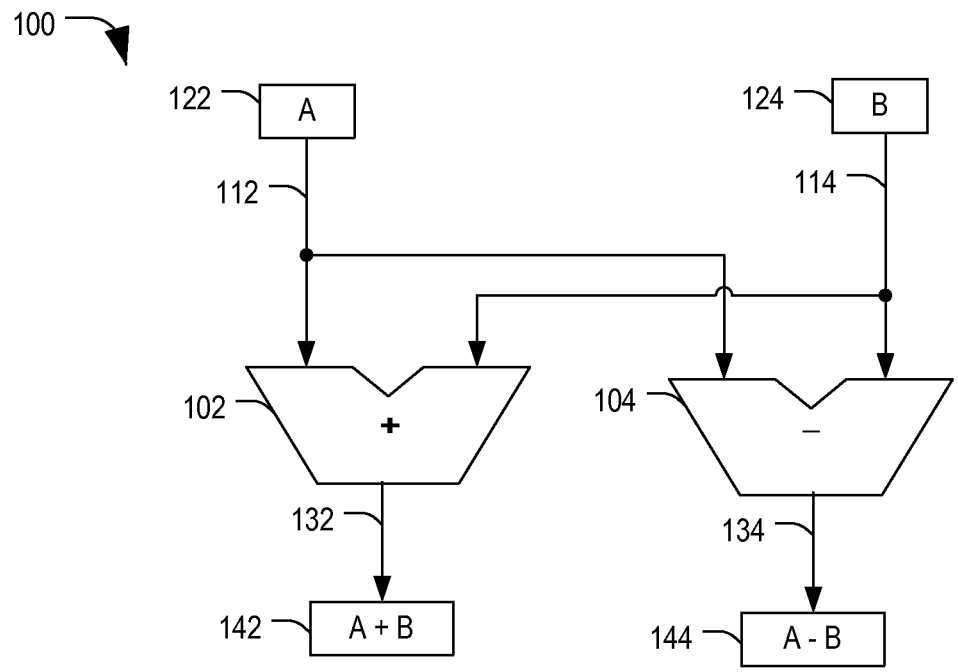
FIG. 1 is a block diagram of a representative example of a conventional, discrete add-subtract unit.

FIG. 1 is a block diagram of a representative example of a conventional, discrete add-subtract unit 100. Add-subtract unit 100 includes addition logic 102 and subtraction logic 104, which are identical arithmetic units arranged in parallel. Addition logic 102 and subtraction logic 104 are responsive to first and second inputs 112 and 114 to receive first and second operands 122 and 124. Addition logic 102 receives the first and second operands 122 and 124, adds them together and provides a sum 142 to a first output 132. Subtraction logic 104 receives the first and second operands 122 and 124, determines a difference, and provides the difference 144 to a second output 134.

In this particular example, addition logic 102 and subtraction logic 104 are fully independent (discrete) adder logic implementations, doubling the circuit area of a single instance of adder logic. Further, addition logic 102 and subtraction logic 104 double the power consumed by a single adder. In this example, add-subtract circuit 100 incurs a large circuit area and power penalty relative to a fused floating-point add-subtract unit such as that described below with respect to FIG. 2.

Figure 2:
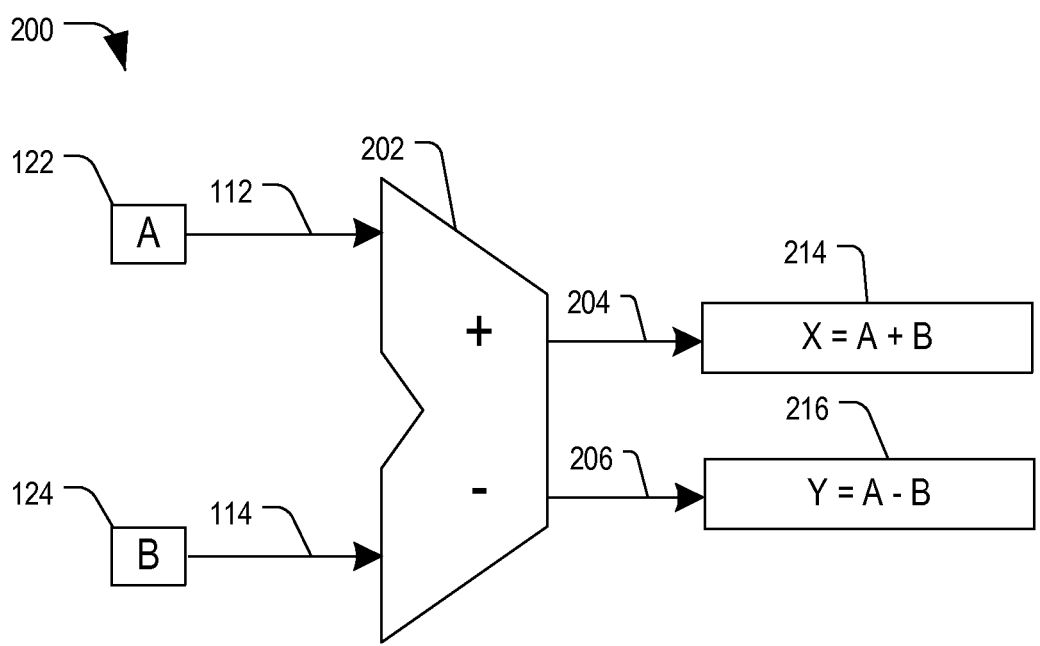
FIG. 2 is a block diagram of an embodiment of a circuit including a fused dual-path floating-point add-subtract unit.

FIG. 2 is a block diagram of an embodiment of a circuit 200 including a fused dual-path floating-point add-subtract unit 202. Fused dual-path floating-point add-subtract unit 202 includes first and second inputs 112 and 114 and first and second outputs 204 and 206. Fused dual-path floating-point add-subtract unit 202 is configured to receive first and second operands 122 and 124, which are floating-point operands, at first and second inputs 112 and 114, and to provide a sum 214 and a difference 216 to outputs 204 and 206, respectively, in response to receiving first and second operands 122 and 124.

In an example, fused dual-path floating-point add-subtract unit 202 performs both add and subtract operations substantially simultaneously. In this instance, the phrase "substantially simultaneously" refers to the operations being performed in parallel, though specific operations (such as shifts, rounds, etc.) may be performed asynchronously. Further, fused dual-path floating-point add-subtract unit 202 supports all five rounding modes specified in the Institute of Electrical and Electronics Engineers (IEEE) 754-Standard. Fused dual-path floating-point add-subtract unit 202 shares common logic to generate the sum and difference in parallel, saving circuit area and power consumption as compared to a discrete floating-point add-subtract unit and reducing latency by utilizing far path logic when the exponents of the operands differ by more than one and by utilizing close path logic when the exponents differ by one or are the same. The inclusion of the dual paths increases the overall speed of the process and simplifies the control signals.

In the far path, addition, subtraction, and rounding logic are performed in parallel. By aligning the significands to the minimal number of bits, the addition, subtraction and rounding logic are simplified. There are three cases for the close path depending on the difference of the exponents. For each case, addition, subtraction and leading zero anticipation (LZA) are performed in parallel and rounding is not required, reducing the latency.

In some embodiments, the fused dual-path floating-point add-subtract unit 202 can be implemented to employ pipelining where components of the far path and the close path are divided into pipeline stages. By arranging the components to control data flow, latencies of the two pipeline stages can be balanced so that the overall throughput is increased. An example of such an implementation is described below with respect to FIG. 11. However, to better understand the enhancement presented by the fused dual-path floating-point add-subtract unit 202, a conventional adder unit and a fused add-subtract unit are introduced below, first, with respect to FIGS. 3 and 4, respectively.

Figure 3:
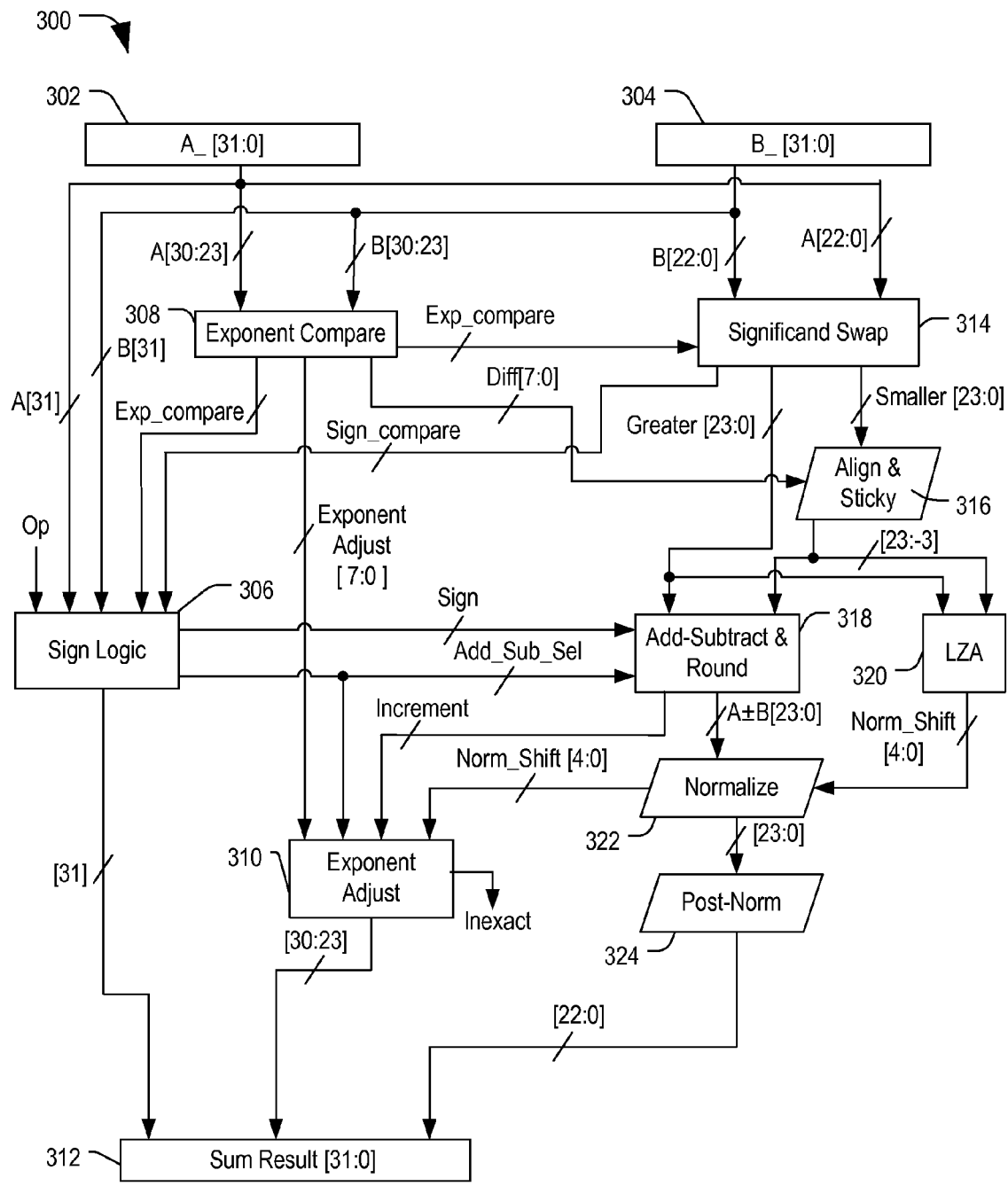
FIG. 3 is a block diagram of a representative example of a conventional floating-point adder.

FIG. 3 is a block diagram of a representative example of a conventional floating-point adder 300. Adder 300 includes a first input for receiving a first operand 122 (labeled "A_[31:0]"), which in this example is a 32-bit floating-point number. Adder 300 further includes a second input for receiving a second operand 124 (labeled "B_[31:0]"), which in this example is a 32-bit floating-point number. Adder 300 includes sign logic 306 configured to receive a most significant bit (MSB) of the first and second operands (labeled "A[31]" and "B[31]", respectively). Adder 300 also includes exponent compare logic 308 including first and second inputs configured to receive exponent bits of first and second operands (labeled "A[30:23]" and "B[30:23]", respectively). Exponent compare logic 308 compares the exponents of first and second operands 122 and 124. Exponent compare logic 308 includes a first output configured to provide an exponent comparison result signal (labeled "Exp_Comp") to an input of sign logic 306, a second output configured to provide the exponent comparison result signal to an input of significand swap logic 314, a third output configured to provide a difference signal (labeled "Diff[7:0]"), representing a difference between the exponents, to align and sticky bit logic 316, and a fourth output configured to provide an exponent adjustment signal (labeled "Exponent Adjust [7:0]") to an input of exponent adjust logic 310.

Significand swap logic 314 includes first and second inputs configured to receive the significands of first and second operands 122 and 124 (labeled "A[22:0]" and "B[22:0]", respectively). Significand swap logic 314 provides the smaller of the significands (labeled "Smaller [23:0]") to an input of align and sticky logic 316 and a greater of the significands (labeled "Greater [23:0]") to an input of add-subtract and round logic 318 and to an input of leading zero anticipation (LZA) logic 320. Align and sticky logic 316 shifts the significand of the smaller operand by the amount of the exponent difference (difference signal Diff[7:0]) for the alignment and attaches the guard, round and sticky bits to the least significant bit (LSB). Align and Sticky logic 316 provides an output signal (labeled "[23:−3]") to an input of add-subtract and round logic 318 and to an input of LZA logic 320.

Since some of the rounding modes specified in the IEEE-754 Standard utilize the sign (i.e., round to positive and negative infinity), the sign logic 306 determines the sign of the sum and the operation decision bit. Sign logic 306 includes a first output to provide the MSB (labeled "[31]") to a most significant bit of a sum result 312. Additionally, sign logic 306 includes a second output to provide the sign of the sum (labeled "Sign") and the operation decision bit (labeled "Add_Sub_Sel") to the round logic and significand adders of add-subtract and round logic 318.

Add-subtract and round logic 318 performs the addition or subtraction of the two significands, depending on the value of the operation bit. Add-subtract and round logic 318 produces rounded and unrounded results, and the round logic selects one of them for a fast rounding operation. The LZA logic 320 generates the amount of cancellation during the subtraction and provides a normalization shift signal (labeled "Norm_Shift[4:0]") to an input of exponent adjust logic 310 and to an input of normalization logic 322, which receives the results from add-subtract and round logic 318. The overflow from add-subtract and round logic 318 is labeled "Increment" and is provided to exponent adjust logic 310. Normalization logic 322 shifts the results based on the normalization signal to produce a normalized output labeled "[23:0]" to a post-normalization logic 324, which provides an output signal labeled "[22:0]" to the lowest twenty-three bits of the sum result 312. Exponent adjust logic uses the shift amount from LZA 320 to generate the exponent sum (labeled "[30:23]", which is provided as bits thirty to twenty-three of sum result 312.

The example of FIG. 3 presents an adder unit that can produce either a sum or a difference. By duplicating the logic circuitry to provide two identical floating-point adder circuits, a sum and a difference value can be calculated in parallel. However, much of the logic (such as exponent comparison, significand swap, and alignment in the two floating-point adders is nearly the same for the two operations. To reduce the overhead, a fused floating-point add-subtract unit can share the common logic for the two operations, as described below with respect to FIG. 4.

Figure 4:
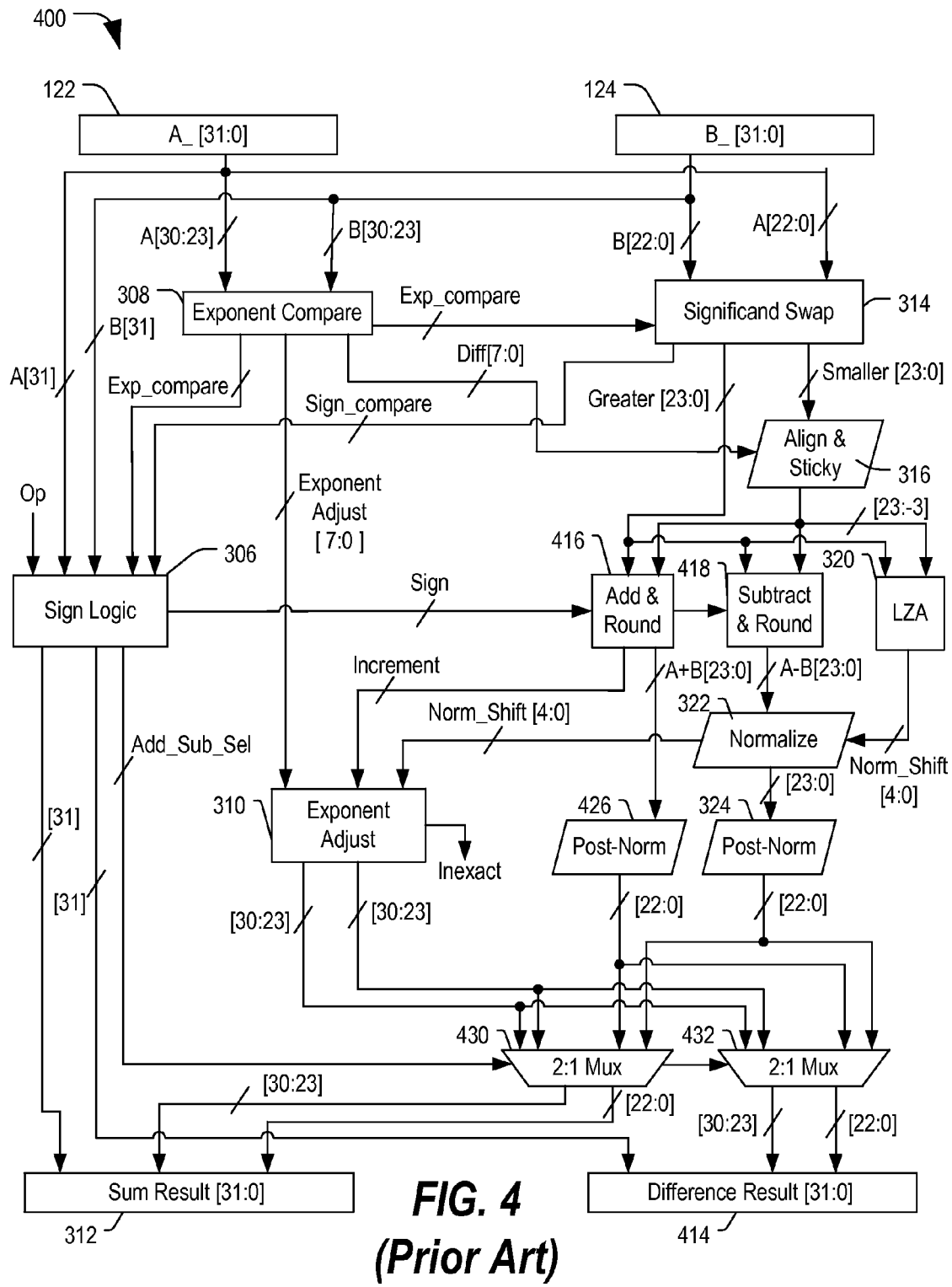
FIG. 4 is a block diagram of a representative example of a conventional fused floating-point add-subtract unit.

FIG. 4 is a block diagram of a representative example of a fused floating-point add-subtract unit 400. In this example, fused floating-point add-subtract unit 400 includes sign logic 306, exponent compare logic 308, exponent adjust logic 310, significand swap logic 314, align and sticky logic 316, LZA logic 320, normalize logic 322, and post-normalization logic 324.

Fused floating-point add-subtract unit 400 includes first and second inputs for receiving first and second operands 122 and 124. Fused floating-point add-subtract unit 400 includes sign logic 306 including a first input to receive an operational signal (labeled "Op"), a second input for receiving the sign bit of first operand 122 (labeled "A[31]"), a third input for receiving the sign bit of second operand 124 (labeled "B[31]"), a fourth input for receiving an exponent comparison signal (labeled "Exp_compare") from exponent compare logic 308, and a fifth input for receiving a significand compare signal (labeled "Sign_compare") from significand swap logic 314. Sign logic 306 includes a first output for providing a sign signal (labeled "sign") indicating a sign of the sum to an input of an add and round logic 416 and to an input of subtract and round logic 418, a second output for providing an MSB labeled "[31]" to an MSB of a sum result 312, a third output for providing an MSB labeled "[31]" to an MSB of a difference result 414, and a fourth output for providing an operation decision bit (labeled "Add_Sub_Sel") to select inputs of two-to-one multiplexers 430 and 432. The operation decision bit represents the exclusive OR (XOR) of the sign bits.

Exponent compare logic 308 includes a first input to receive exponent bits from first operand 122 (labeled "A[30:23]") and a second input to receive exponent bits from second operand 124 (labeled "B[30:23]"). Further, exponent compare logic 308 includes a first output to provide an exponent comparison signal (labeled "Exp_compare") to the fourth input of sign logic 306, a second output to provide the exponent comparison signal (labeled "Exp_compare") to an input of significand swap logic 314, a third output to provide an exponent difference signal (labeled "Diff[7:0]") to an input of align and sticky logic 316, and a fourth output to provide an exponent adjustment signal (labeled "Exponent Adjust [7:0]") to an input of an exponent adjust logic 310.

Significand swap logic 314 includes a first input to receive the significand from first operand 122 (labeled "A[22:0]"), a second input to receive the significand from second operand 124 (labeled "B[22:0]"), and a third input to receive the significand comparison signal from exponent compare logic 308. Significand swap logic 314 further includes a first output to provide the significand comparison signal (labeled "Sign_compare") to the fifth input of sign logic 306. Significant swap logic 314 further includes a second output to provide a greater significand signal (labeled "Greater[23:0]") to an input of each of an add and round logic 416, a subtract and round logic 418, and LZA logic 320. Significand swap logic 314 also includes a third output to provide a smaller significand (labeled "Smaller[23:0]") to a second input of align and sticky logic 316. Align and sticky logic 316 provides an output (labeled "[23:-3]") to a second input of each of add and round logic 416, subtract and round logic 418, and LZA logic 420.

Add and round logic 416 includes a third input for receiving the sign signal from sign logic 406, a first output to provide an increment signal (labeled "increment") to a second input of exponent adjust logic 310, and a second output to provide a sum signal labeled "A+B[23:0]") to an input of a post-normalization logic 426. Post-normalization logic 426 further includes an output to provide a normalized sum signal (labeled "[22:0]") to first inputs of each of multiplexers 430 and 432.

Subtract and round logic 418 includes a first input to receive the greater signal from significand swap logic 314, a second input to receive the output of align and sticky logic 316, and a third input to receive the sign signal from sign logic 306. Subtract and round logic 418 includes an output for providing a difference signal (labeled "A-B[23:0]") to an input of normalization logic 322 LZA logic 320 includes an output coupled to a second input of normalization logic 322 and to a third input of exponent adjust logic 310 to provide a normalization shift signal (labeled "Norm_Shift[4:0]"). Normalization logic 322 includes an output coupled to an input of a post-normalization logic 324 to provide a normalized output signal (labeled "[23:0]"). Post-normalization logic 324 includes an output coupled to second inputs of multiplexers 430 and 432.

Exponent adjust logic 310 includes a first input to receive exponent adjustment signal, a second input for receiving the increment signal, and a third input to receive the normalization shift signal from LZA logic 320. Exponent adjust logic 310 includes a first output coupled to third inputs of multiplexers 430 and 432 to provide a first exponent adjust signal (labeled "[30:23]") and a second output coupled to fourth inputs of multiplexers 430 and 432 to provide a second exponent adjust signal (labeled "[30:23]"). Exponent adjust logic 410 also includes a third output for providing a signal indicating a level of imprecision (labeled "Inexact").

Multiplexer 430 receives the exponent adjust signals and the outputs from post-normalization logic 426 and post-normalization logic 324 and selectively provides a first output (labeled "[30:23]") and a second output (labeled "[22:0]") to bits thirty through zero of sum result 312 in response to the add/subtract select signal from sign logic 306. Further, multiplexer 432 receives the exponent adjust signals and the outputs from post-normalization logic 426 and post-normalization logic 324 and selectively provides a first output (labeled "[30:23]") and a second output (labeled "[22:0]") to bits thirty through zero of difference result 414 in response to the add/subtract select signal from sign logic 306.

In the illustrated example, fused floating-point add-subtract unit 400 performs only one significand addition and subtraction for each operation. Table I depicts a sign decision table based on the signs of the two operands 122 and 124 and comparison of the exponents and significands.

TABLE I

Sign Decision Table

| A Sign | B Sign | Comparison | Sum | Difference |
|---|---|---|---|---|
| + | + | \|A\| < \|B\| | \|A\| + \|B\| | -(\|B\| - \|A\|) |
| + | + | \|A\| > \|B\| | \|A\| + \|B\| | \|A\| - \|B\| |
| + | - | \|A\| < \|B\| | -(\|B\| - \|A\|) | \|A\| + \|B\| |
| + | - | \|A\| > \|B\| | \|A\| - \|B\| | \|A\| + \|B\| |
| - | + | \|A\| < \|B\| | \|B\| - \|A\| | -(\|A\| + \|B\|) |
| - | + | \|A\| > \|B\| | -(\|A\| - \|B\|) | -(\|A\| + \|B\|) |
| - | - | \|A\| < \|B\| | -(\|A\| + \|B\|) | \|B\| - \|A\| |
| - | - | \|A\| > \|B\| | -(\|A\| + \|B\|) | -(\|A\| - \|B\|) |

Since two operations are explicitly performed for sum and difference results (e.g., if the addition is used for the sum, the subtraction is used for the difference), the addition and subtraction are separately placed and only one LZA operation (by LZA logic 320) and one normalization operation (by normalization logic 322 for the subtraction) are performed. Assuming both sign bits are positive, the addition and subtraction are performed separately. Then, two multiplexers 430 and 432 select the sum and difference based on the value of the operation decision bit ("Add_Sub_Sel") from sign logic 306, which is the XOR of the two sign bits.

The approach of fused floating-point add-subtract unit 400 simplifies the addition and subtraction operations as compared to an implementation using parallel discrete floating-point adders. It also reduces the control signals for distinguishing the signs and final results relative to the parallel discrete implementation. Thus, the fused floating-point add-subtract unit 400 achieves low area and low power consumption.

To improve the performance of the fused floating-point add-subtract unit 400, a dual-path (far path and close path) can be implemented as described below with respect to FIG. 5. While the fused floating-point add-subtract unit 400 saves 40% of the area and power consumption compared to a discrete floating-point add-subtract unit, the dual-path fused floating-point add-subtract unit, described below with respect to FIG. 5, reduces the latency by 30% compared to the discrete design. Further, the dual-path implementation falls between that of the discrete and fused designs with respect to area and power consumption.

Figure 5:
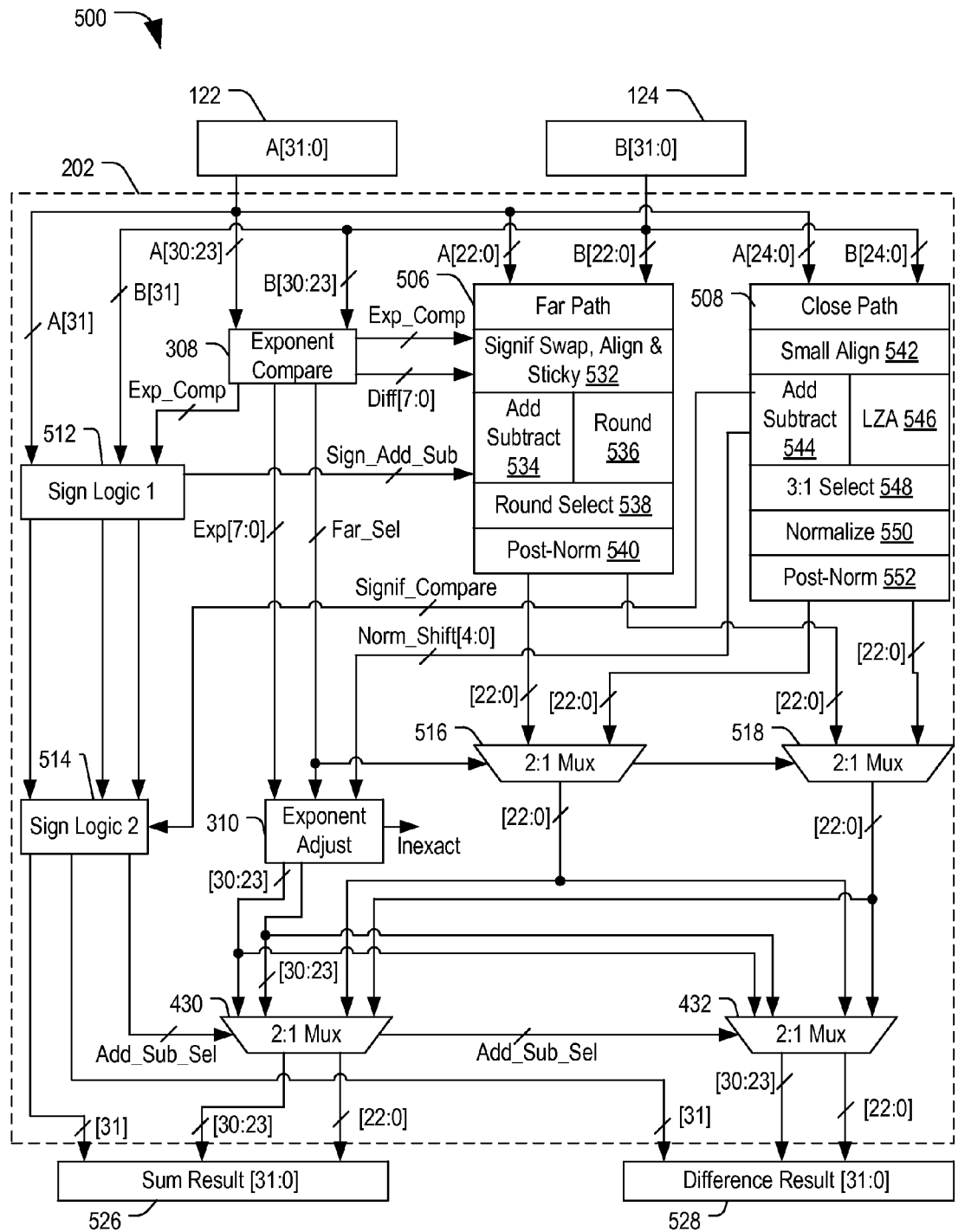
FIG. 5 is a block diagram of a circuit including the fused dual-path floating-point add-subtract unit of FIG. 2.

FIG. 5 is a block diagram of a circuit 500 including the fused dual-path floating-point add-subtract unit 202 of FIG. 2. As compared to the fused floating-point add-subtract unit 400 in FIG. 4, the fused dual-path floating-point add-subtract unit 202 includes exponent compare logic 308, exponent adjust logic 310, and multiplexers 430 and 432.

Fused dual-path floating-point add-subtract unit 202 is responsive to first and second operands 122 and 124 to produce a sum result 526 and a difference result 528. Fused dual-path floating-point add-subtract unit 202 includes far path logic 506 and close path logic 508, which allows fused dual-path floating-point add-subtract unit 202 to skip the normalization step depending on the exponent difference. Since the normalization after the subtraction is one of the bottlenecks in the fused floating-point add-subtract unit 400, fused dual-path floating-point add-subtract unit 202 improves the overall performance Fused dual-path floating-point add-subtract unit 202 include first sign logic 512 including first and second inputs to receive the sign bits of operands 122 and 124 (labeled "A[31]" and "B[31]"), and a third input for receiving an exponent compare signal (labeled "Exp_Comp") from exponent compare logic 308. First sign logic 512 includes a first output to provide sign add-subtract signal (labeled "Sign_Add_Sub") to far path logic 506 and includes second, third, and fourth outputs coupled to second sign logic 514, which includes an input for receiving a significand compare signal (labeled "Signif_Compare") from close path logic 508. Second sign logic 514 includes a first output to provide a sign bit (labeled "[31]") to sum result 526, a second output to provide a sign bit (labeled "[31]") to sum result 528, and a third output coupled to select inputs of multiplexers 522 and 524 to provide add-subtract select signal (labeled "Add_Sub_Sel") to the control inputs of multiplexers 430 and 432. Sign logic 514 performs an exclusive- or (XOR) operation on the sign bits to produce the add subtract select signal. Multiplexer 430 includes a first output to provide an exponent portion (labeled "[30:23]") to sum result 526 and a second output to provide a significand portion (labeled "[22:0]") to sum result 526. Multiplexer 432 includes a first output to provide an exponent portion (labeled "[30:23]") to difference result 528 and a second output to provide a significand portion (labeled "[22:0]") to difference result 528.

Exponent compare logic 308 receives exponents (labeled "A[30:23]" and "B[30:23]") of operands 122 and 124, determines the difference (labeled "Diff[7:0]") and the exponent comparison signal (labeled "Exp_comp") and provides them to far path logic 506. Exponent compare logic 308 also provides the exponent comparison signal to sign logic 512 and provides a far path select signal (labeled "Far_Sel") and an exponent signal (labeled "Exp[7:0]") to exponent adjust circuit 310. The far path select signal is also provided to multiplexers 516 and 518.

Figure 6:
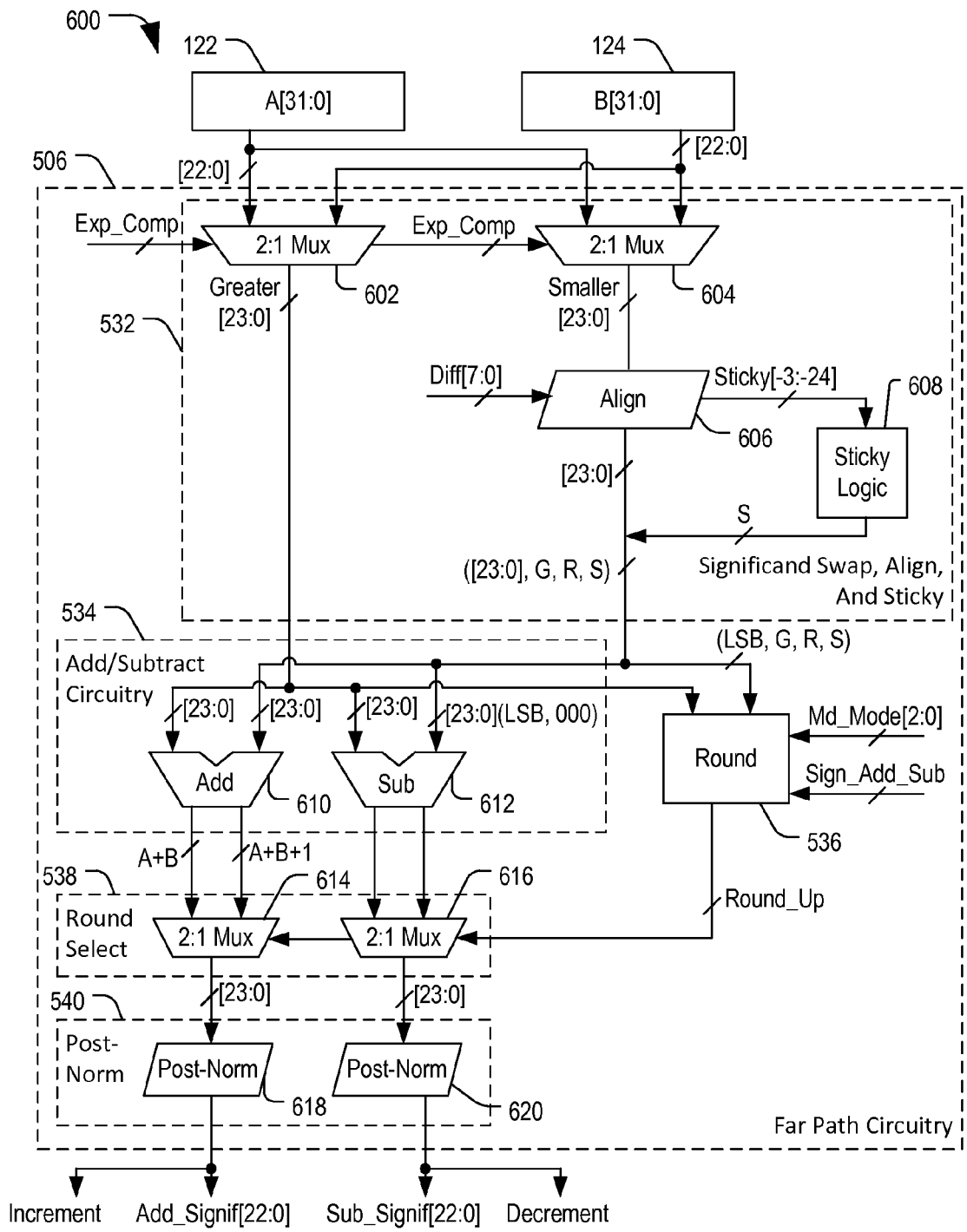
FIG. 6 is a block diagram of an embodiment of far path logic of the fused dual-path floating-point add-subtract unit of FIG. 5.

Far path logic 506 includes a first input and a second input to receive the significands (labeled "A[22:0]" and "B[22:0]") of operands 122 and 124 when the difference of the exponents (as determined by exponent compare logic 308) is greater than one as shown on FIG. 6. When the exponents differ by more than one, massive cancellation does not occur during the subtraction operation within far path logic 506, so the LZA logic can be omitted.

Far path logic includes significand swap, align and sticky logic 532, add-subtract logic 534, round logic 536, round select logic 538, and post-normalization logic 540. The greater and smaller significands are determined by swapping the two significands based on the exponent comparison (exponent difference or $\text{diff}_{exp}$):

$$greater_{signif} = \begin{cases} (1, A[22:0]), & \text{if } A_{exp} > B_{exp} \\ (1, B[22:0]), & \text{if } A_{exp} < B_{exp} \end{cases} \quad (1)$$

$$smaller_{signif} = \begin{cases} (1, B[22:0]) \gg \text{diff}_{exp}, & \text{if } A_{exp} > B_{exp} \\ (1, A[22:0]) \gg \text{diff}_{exp}, & \text{if } A_{exp} > B_{exp} \end{cases}$$

Figure 7:
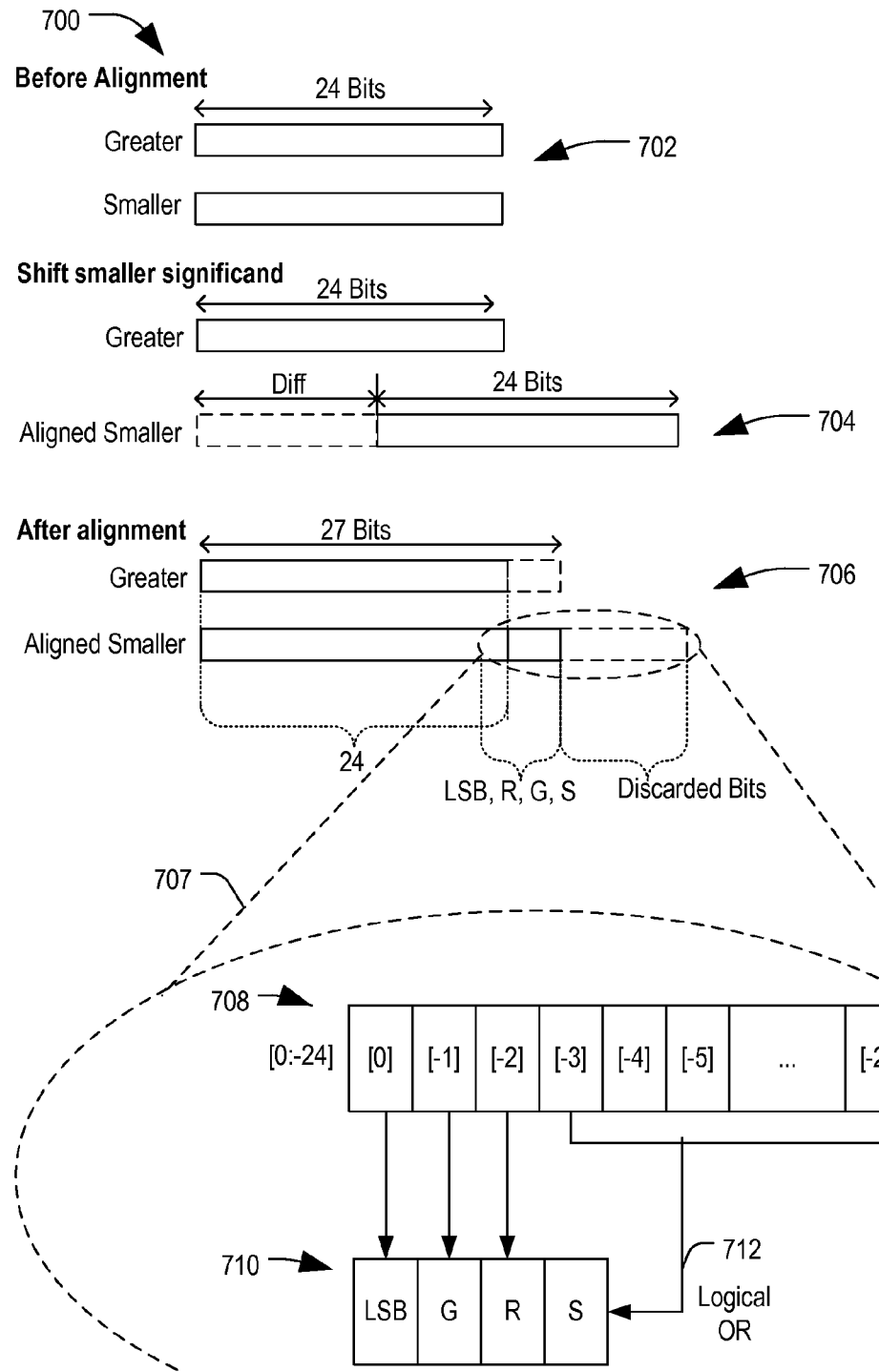
FIG. 7 is a representative example of the logical operation for producing a smaller significand including guard, round, and sticky bits from an aligned version of the smaller significand.

The two significands are aligned with a 1 attached to the MSB end to make 24-bit normalized significands. By aligning the two significands to 24-bits, significand addition and subtraction operations are simplified, resulting in a reduction in the logic area and the delay. The significand of the smaller operand is right shifted by amount of the exponent difference and aligned to 24-bits. The sticky bit is set if at least one bit of the 22 LSBs is a 1 and the 23rd and the 24th LSBs become the round and guard bits, respectively, as shown in FIG. 7.

Since the significand of the larger operand is not shifted, the 24-bit significand is kept as it is without guard, round and sticky bits. The greater and smaller significands are passed to the addition and subtraction units 534. For fast integer addition and subtraction, the Kogge-Stone parallel prefix approach may be used, which was described in a published article by P. M. Kogge and H. S. Stone, "A parallel algorithm for the efficient solution of a general class of recurrence equations," IEEE Trans. Comput., vol. C-22, no. 8, pp. 786-793, August 1973. The addition and subtraction units 534 produce the rounded and unrounded results and one of them is selected by the round select logic 538 as follows:

$$Add_{signif} = \begin{cases} A + B + 1, & \text{if } round_{up} = 1 \\ A + B & \text{otherwise} \end{cases} \quad (2)$$

$$Sub_{signif} = \begin{cases} A + \overline{B} + 2, & \text{if } round_{up} = 1 \\ A + \overline{B} + 1, & \text{otherwise.} \end{cases}$$

The round logic 536 takes the LSBs, guard, round and sticky bits of the two significands and performs 4-bit addition and subtraction to determine if the result is rounded up or not for each operation. Also, round logic 536 uses the sign bits of the addition and subtraction to support all five round modes specified in IEEE-754 Standard as shown in Table II.

TABLE II

Round Table.

| Round Mode [2:0] | Result of 4-Bit Add-Subtract (LSB, G, R, S) | Sign | Round Up |
|---|---|---|---|
| Round to zero (000) | X | X | 0 |
| Round to positive infinity (001) | X000 | X | 0 |
|  | Else | + | 1 |
|  |  | − | 0 |
| Round to negative infinity (010) | X000 | X | 0 |
|  | Else | + | 0 |
|  |  | − | 1 |
| Round to nearest even (011) | ≤0100 | X | 0 |
|  | >0100 |  | 1 |
| Round to nearest away from zero (100) | ≤0100 | X | 0 |
|  | >0100 |  | 1 |

In Table II, the variable "X" means "don't care." Since the far path logic 506 uses, at most, a 1-bit normalization shift for both addition and subtraction, it avoids a large normalization procedure.

Figure 9:
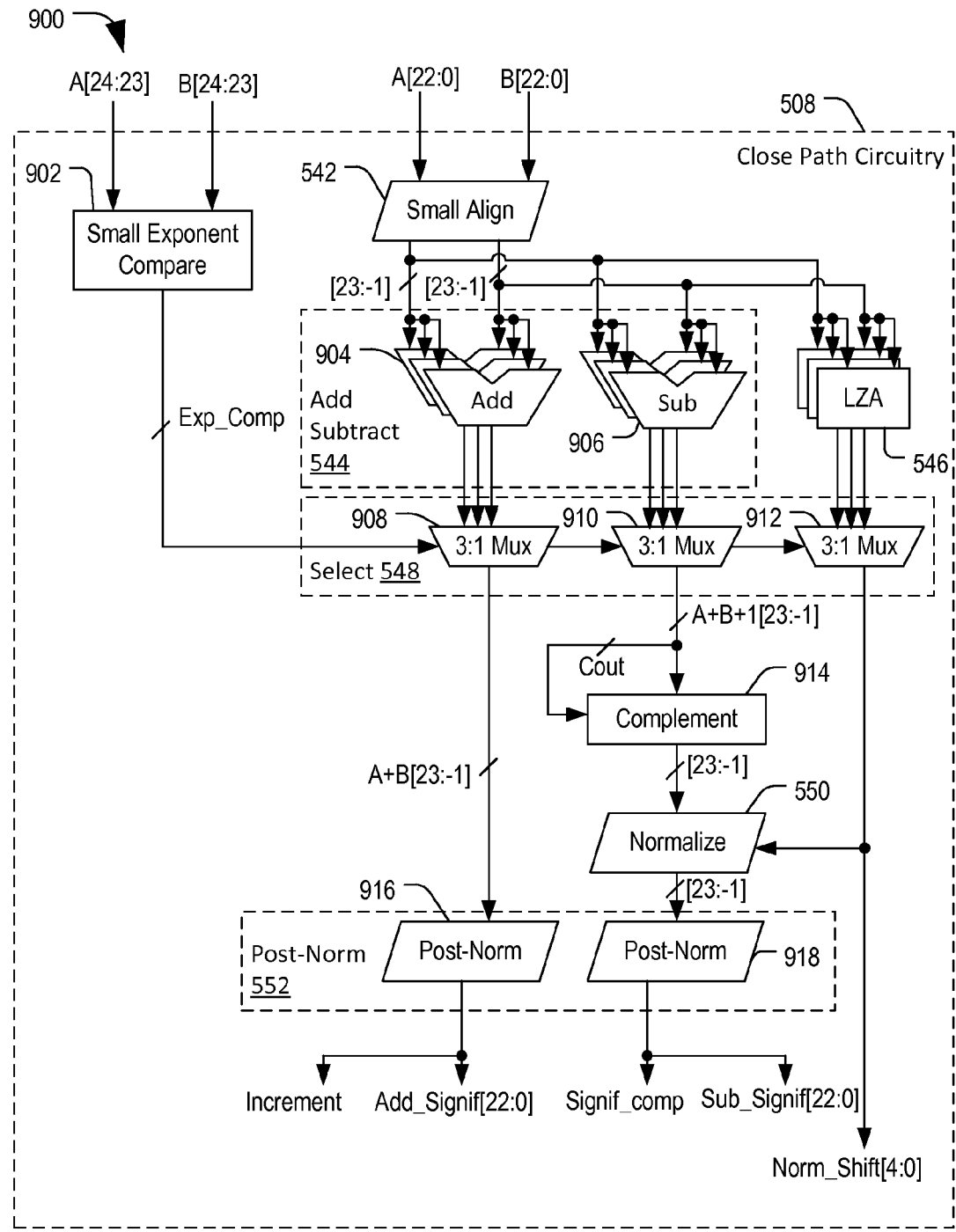
FIG. 9 is a block diagram of an embodiment of close path logic of the fused dual-path floating-point add-subtract unit of FIG. 5.

Close path logic 508 as shown on FIG. 9 takes the significands if the difference of the two exponents is 0 or 1. There are three cases for the close path logic 508 depending on the difference of the exponents:

$$A_{signif}[23:-1] = \begin{cases} (1, A[22:0], 0), & \text{if } A_{exp} - B_{exp} = 1 \\ (1, A[22:0], 0), & \text{if } A_{exp} - B_{exp} = 0 \\ (01, A[22:0], 0), & \text{if } A_{exp} - B_{exp} = -1 \end{cases} \quad (3)$$

$$B_{signif}[23:-1] = \begin{cases} (01, B[22:0], 0), & \text{if } A_{exp} - B_{exp} = 1 \\ (1, B[22:0], 0), & \text{if } A_{exp} - B_{exp} = 0 \\ (1, B[22:0], 0), & \text{if } A_{exp} - B_{exp} = -1 \end{cases}$$

For each case, addition and subtraction logic 544 and LZA logic 546 are performed simultaneously. LZA logic 546 with concurrent correction is used for a fast normalization. One of the three results is selected based on the small exponent comparison, which compares the two LSBs of the exponents. In contrast to the far path logic 506, the significands are not swapped to avoid a large significand comparison. When the subtraction result is negative, a two's complement operation is performed to convert the result to a positive value. The carry-out of the subtraction indicates a significand comparison (labeled "Signif_Compare"), which is passed to sign logic 514, to determine the sign bits when the two exponents are equal. Since the significands in the close path logic 508 are misaligned by at most 1-bit, rounding is not required. The addition result is normalized using normalization logic 550 by 1-bit overflow, while the subtraction result is normalized using normalization logic 550 by up to 23-bits using the shift amount from LZA logic 546.

Sign logic 512 generates two sign bits of the addition and subtraction for the rounding in far path logic 506, and second sign logic 514 generates the sign bits of the sum and difference and an operation decision bit (labeled "Add_Sum_Sel"). In the case of far path logic 506, the exponent difference is large enough to determine the sign bits with the exponent comparison. Since round logic 536 requires the sign bits, the sign bits are passed to far path logic 506. Close path logic 508, however, uses significand comparison for the case of equal exponents. Therefore, the sign bits of the sum and difference are generated after the significand comparison bit is provided by close path logic 508. The sign logic for sign bits and an operation decision bit are as follows:

$$Add_{sign} = A_{sign}$$

$$Sub_{sign} = A_{sign} comp_{exp} + \overline{A}_{sign} \overline{comp}_{exp}$$

$$Sum_{sign} = A_{son} B_{sign} + A_{sign} comp_{exp} + A_{sign} comp_{signif} + B_{sign} \overline{comp}_{exp} \overline{comp}_{signif}$$

$$Diff_{sign} = A_{sign} \overline{B}_{sign} + A_{sign} comp_{exp} + A_{sign} comp_{signif} + B_{sign} \overline{comp}_{exp} \overline{comp}_{signif}$$

$$Add\_Sub\_Sel = A_{sign} \oplus B_{sign} \quad (4)$$

In (4) above, the values ($comp_{exp}$ and $comp_{signif}$) are the comparison results of exponents and significands, respectively. Once the operation decision bit is generated by sign logic 514, the operation decision bit is passed to multiplexers 430 and 432 for selecting the sum and difference.

In general, instead of executing two identical floating-point adders, the fused floating-point add-subtract unit shares the common logic to generate the sum and difference simultaneously. Therefore, it saves much of the area and power consumption compared to a discrete floating-point add-subtract unit. Also, it reduces the latency by simplifying the control signals. The dual-path logic (far path logic 506 and close path logic 508) is applied to increase speed. In far path logic 506, the addition, subtraction and rounding logic are performed in parallel. By aligning the significands to the minimal number of bits, the addition, subtraction and rounding logic are simplified. For each case, addition, subtraction and leading zero anticipation (LZA) are performed in parallel and rounding is not required. Therefore, the dual-path design reduces the latency of the critical path. One possible example of an implementation of far path logic 506 is described below with respect to FIG. 6.

FIG. 6 is a block diagram of an embodiment of far path logic 506 of the fused dual-path floating-point add-subtract unit 202 of FIG. 5. Far path logic 506 receives the significands (A[22:0] and B[22:0]) of operands 122 and 124. Far path logic 506 includes significand swap, align, and sticky bit logic 532, which includes multiplexers 602 and 604. Each of multiplexers 602 and 604 include inputs for receiving the significands and control input for receiving an exponent comparison signal from exponent compare logic 308 in FIG. 5. Multiplexer 602 aligns the two significands to 24-bits by appending a 1 to the MSB end to make a 24-bit normalized significand, and provides a selected one of the aligned significands (labeled "Greater[23:0]") to add subtract logic 534 and round logic 536 in response to the exponent comparison signal. By aligning the two significands, the addition and subtraction operations are simplified, resulting in a reduction of the logic area and delay. Since the significand of the larger operand (Greater[23:0]) is not shifted, the significand is kept as is without a guard, round, or sticky bits.

Multiplexer 604 also aligns the two significands by appending a 1 to the MSB end, and selectively provides one of the two significands (labeled "Smaller[23:0]") to align logic 606. Align logic 606 shifts the smaller significand by an amount of the exponent difference signal from exponent compare logic 308, and the shifted significand is provided to sticky logic 608, which sets the sticky bit (S) if at least one of the 22 least significant bits is a 1, and the $23^{rd}$ and $24^{th}$ least significant bits become the round bit (R) and the guard bit (G), respectively, to produce an adjusted significand (labeled "[23:0], G, R, S"), which is provided to add subtract logic 534 and round logic 356.

Add subtract logic 534 includes an adder 610 configured to add the aligned significands to produce rounded and unrounded results, which are provided to round select logic 538. Add subtract logic 534 further includes a subtraction unit 612 configured to subtract the significands and to produce rounded and unrounded results that are provided to round select logic 538.

Round select logic 538 includes a multiplexer 614 having inputs to receive rounded and unrounded sums and a select input to receive a round up selection bit (labeled "Round_Up") from round logic 536. Round logic 536 receives the greater significand from multiplexer 602 and the LSB, guard, round and sticky bits from align logic 606 and sticky logic 608. Round logic 536 also receives a mode setting and the sign add-subtract signal from sign logic 512 in FIG. 5. In response to the inputs, round logic 536 determines whether the rounded or unrounded results should be selected and provides a round up signal to multiplexers 614 and 616. Further, multiplexer 614 includes an output configured to provide selected sum to post-normalization logic 540. Round select logic 538 further includes a multiplexer 616 having inputs to receive rounded and unrounded differences from subtraction unit 612 and the round up signal from round logic 536. Multiplexer 616 also includes an output configured to provide a selected difference to post-normalization logic 540.

Post-normalization logic 540 includes a post-normalization unit 618 to receive the selected sum from multiplexer 614 and to provide an output including the addition significand and an increment bit. Post-normalization logic 540 further includes a post-normalization unit 620 to receive the selected difference from multiplexer 616 and to provide an output including the subtraction significand and a decrement bit.

FIG. 7 is a representative example of the logical operation 700 for producing a smaller significand including guard, round, and sticky bits from an aligned version of the smaller significand. The sticky bit is set if at least one bit of the 22 LSBs is a 1 and the 23rd and the 24th LSBs become the round and guard bits, respectively. In example 700, before alignment as generally indicated at 702, both the greater significand and the smaller significand are comprised of 24 bits. At 704, the smaller significand is shifted right using align logic 606 by the difference bits from exponent compare logic 308. After alignment as generally indicated at 706, the greater and aligned smaller significands are comprised of the 24 bits plus round, guard and sticky bits.

In the callout generally depicted at 707, a least significant bit [0] of aligned smaller significand 708 becomes the least significant bit (LSB) of an output significand. Bit [−1] becomes the guard bit (G) in the output significand. Bit [−2] becomes the round bit (R). The remaining discarded bits of aligned smaller significand 708 are processed using sticky logic 608, which performs a logical OR operation 712 to produce a sticky bit (S), such that if any of those bits have a "1" value, the sticky bit is set. Thus, the logical operation produces a twenty-four-bit output significand including a least significant bit, and including guard, round, and sticky bits, generally indicated at 710.

Figure 8:
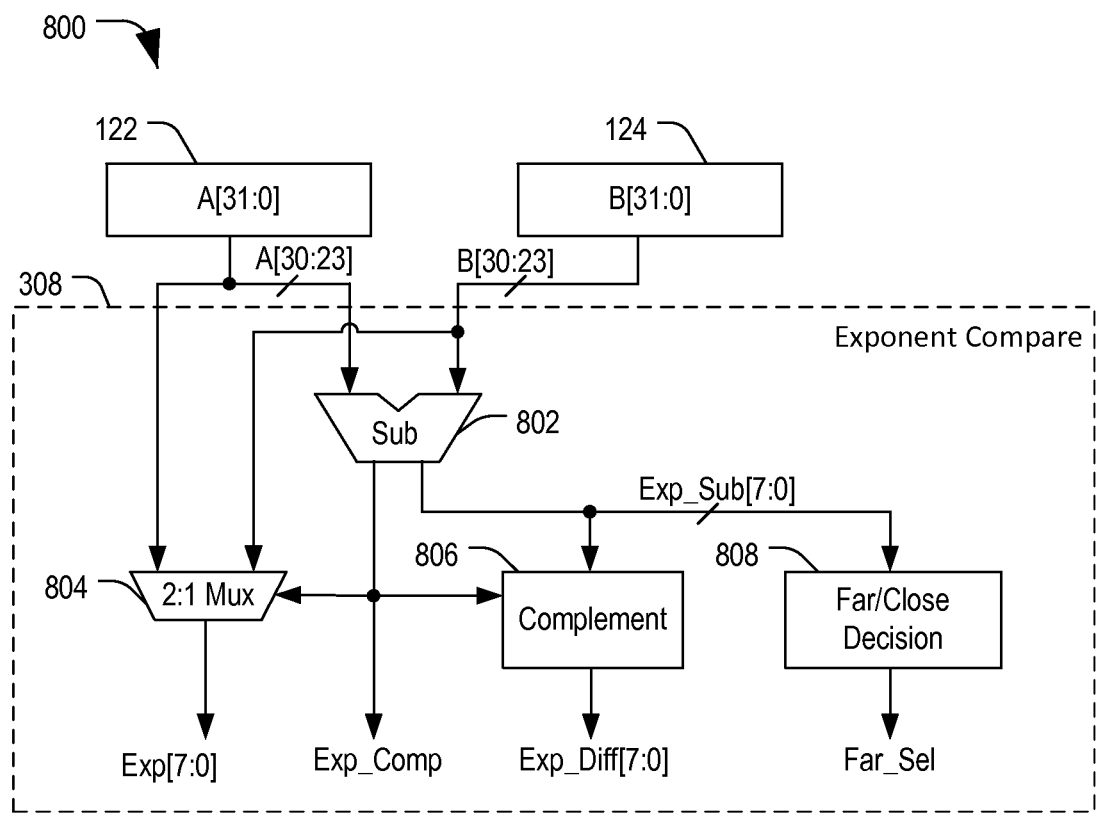
FIG. 8 is a block diagram of exponent compare logic of the fused dual-path floating-point add-subtract unit of FIG. 5.

FIG. 8 is a block diagram of exponent compare logic 308 of fused dual-path floating-point add-subtract unit 202 of FIG. 5. Exponent compare logic 308 includes a subtract unit 802 having first and second inputs for receiving exponents of operands 122 and 124. Additionally, exponent compare logic 308 includes a multiplexer 804 having first and second inputs for receiving the exponents of operands 122 and 124. Subtract unit 802 calculates the difference (labeled "Exp_Sub[7:0]") between the two exponents and provides the difference to complement logic 806 and far/close decision logic 808. Subtract unit 802 also determines which exponent is greater and produces an exponent comparison output (labeled "Exp_Comp"), which is provided as an output and which is provided to a control input of multiplexer 804 to select one of the exponents to provide a selected output (labeled "Exp[7:0]"). Complement logic 806 includes an output to provide an exponent difference (labeled "Exp_Diff[7:0]"). In addition to this, the path decision between the far path and the close path based on the exponent difference provides a far path selection bit as follows:

$$\text{far\_sel} = \begin{cases} 1, & \text{if } A_{exp} - B_{exp} \in \{-1, 0, 1\} \\ 0, & \text{otherwise.} \end{cases} \quad (5)$$

The path decision flag (bit or signal) is passed to multiplexers 516 and 518 for selecting the addition and subtraction results between far path logic 506 and close path logic 508.

FIG. 9 is a block diagram of an embodiment of close path logic 508 of fused dual-path floating-point add-subtract unit 202 of FIG. 5. In general, close path logic 508 is split into three paths representing three cases of exponent differences (−1, 0, or 1). Close path logic 508 performs three additions, three subtractions, and three LZA operations. This enables a reduction in latency by at least the amount of latency in the exponent compare logic 902.

Close path logic 508 includes small exponent compare logic 902 having inputs for receiving the two LSBs of the exponents (labeled "A[24:23]" and "B[24:23]") and an output for providing an exponent comparison bit (labeled "Exp_Comp") to an add subtract unit 544. Close path logic 508 further includes small align logic 542 having inputs for receiving significands (labeled "A[22:0]" and "B[22:0]"). Small align logic 542 shifts the significands to produce shifted significands (labeled "[23:−1]") at outputs coupled to add units 904, subtract units 906, and LZA units 546.

Each of the add units 904, subtract units 906, and LZA units 546 have three parallel components. Add units 904 have outputs coupled to inputs of a multiplexer 908 of select logic 548. Subtract units 906 have outputs coupled to inputs of multiplexer 910 of select logic 548. LZA units 546 have outputs coupled to inputs of multiplexer 912 of select logic 548, and multiplexer 912 provides a normalization shift output signal (labeled "Norm_Shift[4:0]") to an output. Multiplexer 908 provides a selected one of the sums from add units 904 to post-normalization unit 916 of post-normalization logic 552 based on the exponent comparison signal. Post-normalization unit 916 provides an output including a sum (labeled "Add_Signif[22:0]") and an increment. Multiplexer 910 provides a selected one of the differences from subtract units 906 to a complement unit 914, which produces an aligned output. Complement unit 914 provides the aligned output to normalize unit 550, which provides a normalized difference to a post-normalization unit 918 of post-normalization logic 552 based on the exponent comparison signal. Post-normalization unit 918 provides an output including a difference (labeled "Sub_Signif[22:0]") and a significand complement (or decrement).

Close path logic 508 takes the significands when the difference of the two exponents is 0 or 1. There are three cases for the close path depending on the difference of the exponents:

$$A_{signif}[23:-1] = \begin{cases} (1, A[22:0], 0), & \text{if } A_{exp} - B_{exp} = 1 \\ (1, A[22:0], 0), & \text{if } A_{exp} - B_{exp} = 0 \\ (01, A[22:0], 0), & \text{if } A_{exp} - B_{exp} = -1 \end{cases} \quad (6)$$

$$B_{signif}[23:-1] = \begin{cases} (01, B[22:0], 0), & \text{if } A_{exp} - B_{exp} = 1 \\ (1, B[22:0], 0), & \text{if } A_{exp} - B_{exp} = 0 \\ (1, B[22:0], 0), & \text{if } A_{exp} - B_{exp} = -1 \end{cases}$$

For each case, addition, subtraction and LZA operations are performed simultaneously. LZA logic 546 with concurrent correction is used for a fast normalization. One of the three results is selected based on the small exponent comparison from small exponent compare logic 902, which compares the two LSBs of the exponents. In contrast to the far path logic 506, the significands are not swapped, avoiding a large significand comparison. When the subtraction result is negative, a two's complement operation is performed to convert the result to a positive value. The carry-out of the subtraction indicates a significand comparison, which is passed to the sign logic, to determine the sign bits when the two exponents are equal. Since the significands in the close path are misaligned by at most 1-bit, rounding is not required. The addition result is normalized by 1-bit overflow, while the subtraction result is normalized by up to 23-bits using the shift amount from the LZA unit 546.

Figure 10:
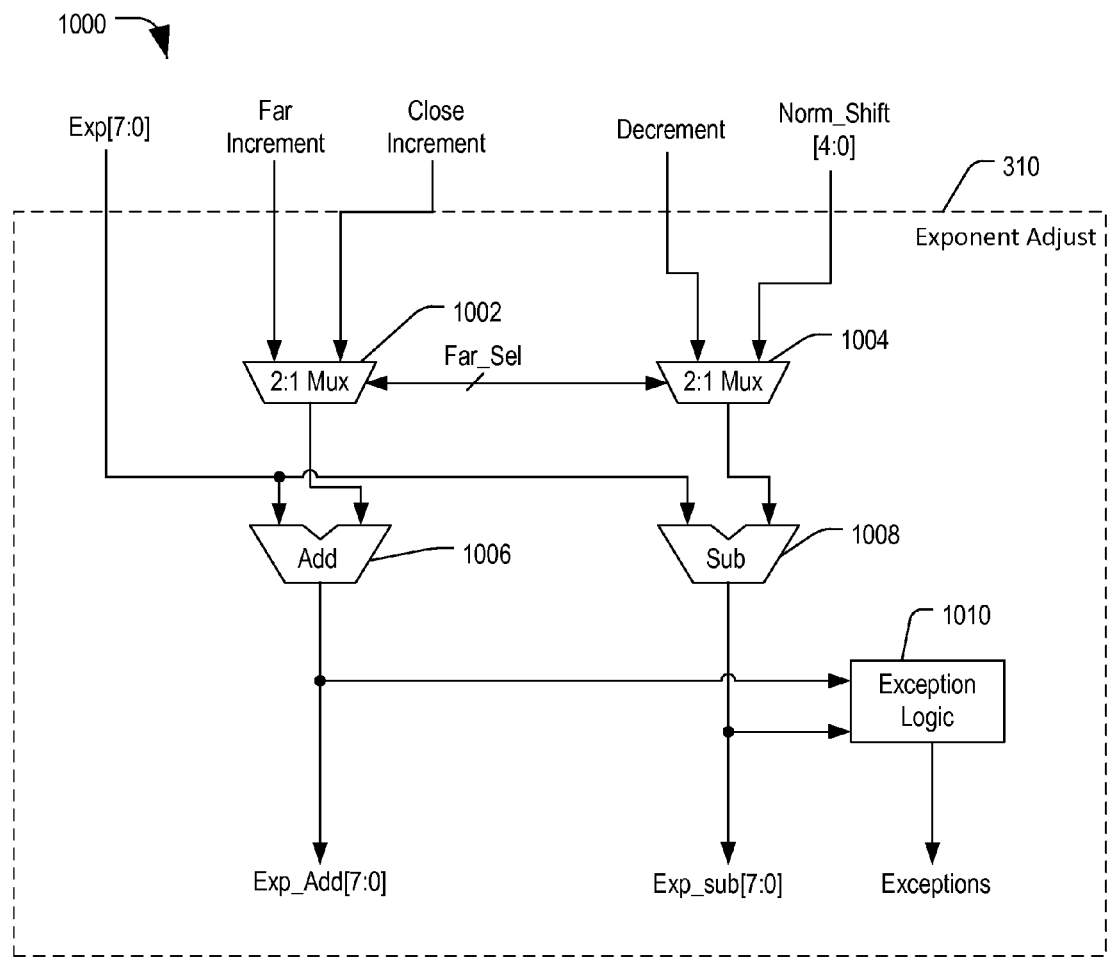
FIG. 10 is a block diagram of exponent adjust logic of the fused dual-path floating-point add-subtract unit of FIG. 5.

FIG. 10 is a block diagram of exponent adjust logic 310 of fused dual-path floating-point add-subtract unit 202 of FIG. 5. Exponent adjust logic 310 includes a multiplexer 1002 having first and second inputs for receiving a far increment from post normalization logic 618 in FIG. 6 and a close increment signal from post-normalization logic 916 in FIG. 9, a control signal for receiving the far select signal from exponent compare logic 308 in FIG. 5, and an output coupled to an input of an add unit 1006. Add unit 1006 includes a second input for receiving the exponent signal from multiplexer 804 in FIG. 8 and an output for providing an exponent addition result (labeled "Exp_Add[7:0]"). The exponent adjust logic 310 includes a multiplexer 1004 having a first input for receiving a decrement signal from post-normalization logic 620 in FIG. 6, a second input for receiving the normalization shift signal (labeled "Norm_Shift[4:0]") from LZA logic 546, and an output coupled to an input of subtraction unit 1008. Subtraction unit 1008 includes a second input for receiving the exponent signal from multiplexer 804 in FIG. 8 and an output for providing an exponent subtraction result (labeled "Exp_sub[7:0]"). Exponent adjust logic 310 includes exception logic 1010 having a first input for receiving the exponent additional result, a second input for receiving the exponent subtraction result, and an output for providing an exceptions signal.

Exponent adjust logic 310 performs addition and subtraction to adjust the exponents by the amount that the significands are shifted. Exponent adjust logic 310 produces two exponent results (Exp_Add[7:0] and Exp_sub[7:0]) simultaneously. In the case of addition, one of the increment values is added depending on the path decision that is the overflow from the significand addition. In the case of subtraction, if the far path logic 506 is selected, the decrement value is subtracted that is the underflow from the significand subtraction.

If the close path logic 508 is selected, the normalization shift value is subtracted that is the shift amount of the massive cancellation that occurred during the subtraction. The two adjusted exponents are passed to the exception logic 1010. Since underflow does not occur in default exception handling, the exception logic 1010 supports abrupt underflow, which detects underflow caused by tiny non-zero results in addition to all exception cases covered by default exception handling. Abrupt underflow is an alternate exception handling specified in IEEE 754-Standard to detect the following three exception cases:

$$\text{overflow} = \begin{cases} 1, & \text{if } \exp[7:0] \geq 8 \times FF \\ 0, & \text{otherwise} \end{cases} \quad (7)$$

$$\text{underflow} = \begin{cases} 1, & \text{if } \exp[7:0] \leq 8 \times 00 \\ 0, & \text{otherwise} \end{cases}$$

$$\text{inexact} = \text{round\_up} || \text{overflow} || \text{underflow}$$

In (7) above, round up is the rounding decision of the significand result. The overflow flag is set if the exponent exceeds the maximum value that can be represented such as positive and negative infinity. The underflow flag is set if the exponent is too small to be represented, such as in the event of zero and subnormal values. Overflow only occurs in addition and underflow only occurs in subtraction. The inexact flag at the output of exponent adjust 310 is set if the rounded significand result is not exact, which is the case if either of the rounding bit, overflow flag or underflow flag is set.

While the above-discussion has focused on an enhancement to the fused floating-point add-subtract unit that uses dual paths (far path logic 506 and close path logic 508), the throughput of the dual-path approach can be improved by splitting fused dual-path floating-point add-subtract unit 202 into two pipeline stages. By balancing the latencies of the two pipeline stages, the throughput can be increased by as much as 80% compared to the non-pipelined dual-path design.

Within the fused floating-point add-Subtract unit 400, each component contributes to the overall latency of the unit. The latencies of the various elements of the single precision fused floating-point add-subtract unit 400 are listed in Table III.

TABLE III

Component Latencies in the Fused Floating-Point Add-Subtract Unit.

| Components | Latency (ns) |
|---|---|
| Unpack | 0.02 |
| Exponent Compare | 0.19 |
| Significand Swap | 0.09 |
| Sign Logic 1 | 0.06 |
| Align & Sticky | 0.16 |
| Add | 0.23 |
| Subtract | 0.25 |
| Round | 0.16 |
| Round Select | 0.04 |
| Sign Logic 2 | 0.06 |
| Operation Select | 0.04 |
| Small Exponent Compare | 0.09 |
| Small Significand Align | 0.14 |
| Add x 3 | 0.27 |
| Subtract x 3 | 0.29 |
| LZA x 3 | 0.23 |
| 3:1 Select | 0.07 |
| Complement | 0.12 |
| Normalization | 0.14 |
| Path Select | 0.04 |
| Exponent Adjust | 0.11 |

In the dual-path fused floating-point add-subtract unit 202, since several components are executed in parallel, they may be combined within a pipelined stage (such as the first stage or the second stage) and the sum of the component delays can determine the latency of the stage. Considering the latencies of components and their parallel execution, the proposed design is split into two pipeline stages. Each pipeline stage is executed every cycle so that the largest latency determines the throughput of the design.

Figure 11:
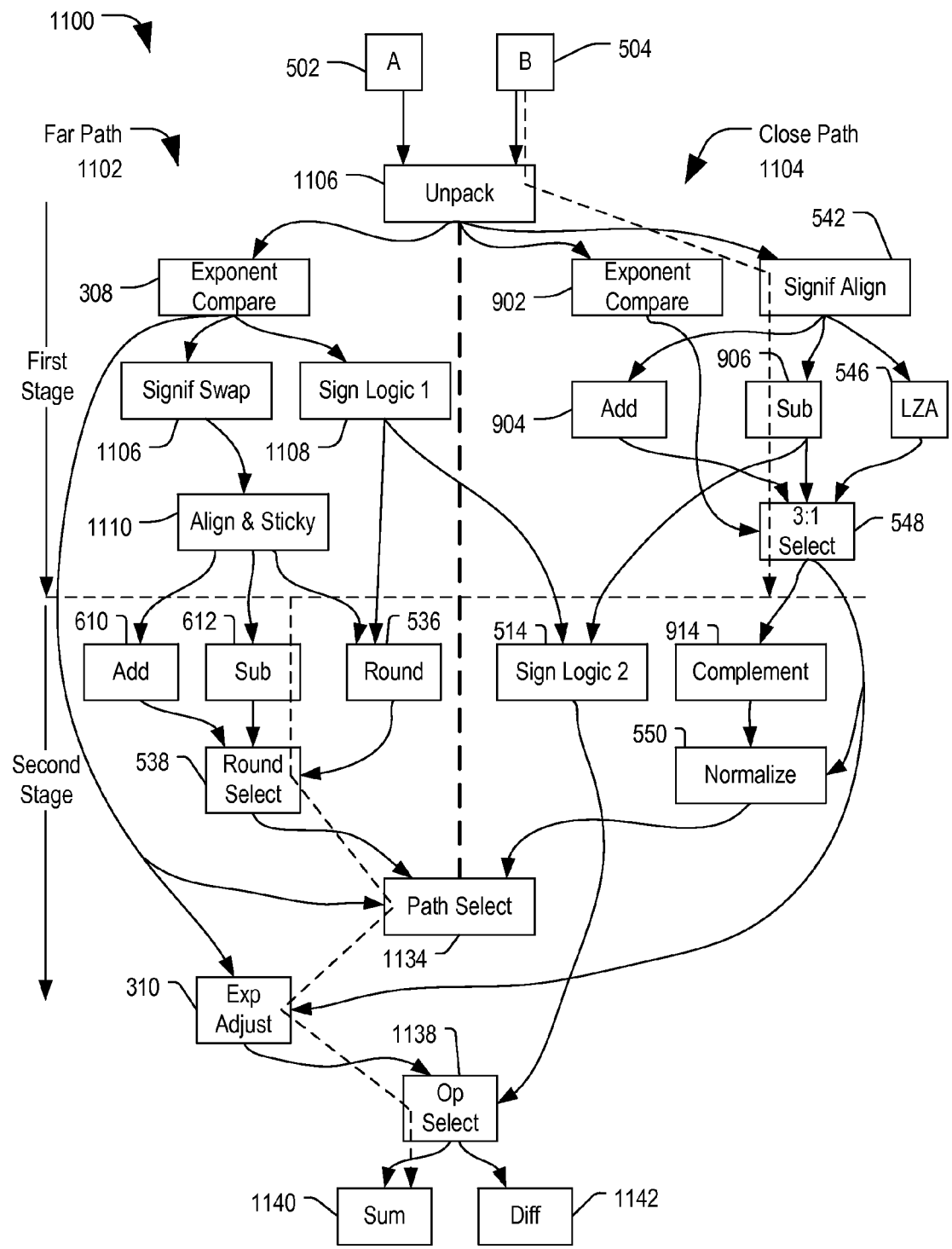
FIG. 11 is a block diagram of a data flow for an embodiment of a pipelined, fused dual-path floating-point add-subtract unit.

FIG. 11 is a block diagram of a data flow for an embodiment of a pipelined, fused dual-path floating-point add-subtract unit 1100. The components of pipelined, fused dual-path floating-point add-subtract unit 1100 are organized into two pipeline stages. Critical paths of the two pipeline stages (as determined based on the larger latency) include:

First stage: Unpack 1106 to Small Significand Align logic 542 to Close Path Significand Subtraction logic 906 to 3:1 Select 548; and Second Stage: Far Path Significand Subtraction 612 to Round Select 538 to Path Select 1134 to Exponent Adjust logic 310 to Operation Select 1138.

In this example, the first pipeline stage consists of unpacking logic 1106 and the two data paths: the far path 1102 and the close path 1104. The two data paths are the first half of the dual path in FIGS. 5, 6 and 9. The far path 1102 in the first pipeline stage includes exponent compare logic 308, sign logic 1108, significand swap logic 1106, align and sticky logic 1110. The close path 1104 in the first pipeline stage includes small exponent compare 902, small significand align 542, addition logic 904, subtraction logic 906, LZA logic 546, and select logic 548. In the first stage, the close path 1104 has the larger latency so that it represents the critical path (indicated by the dashed arrow). The series of components in the close path 1104 determines the latency of the first pipeline stage, which latency is approximately 0.52 ns.

The second half of the dual path and the remaining logic comprise the second pipeline stage. The far path 1102 in the second pipeline stage contains the addition logic 610, subtraction logic 612, round logic 536, and round select logic 538. The close path 1104 in the second pipeline stage contains sign logic 514, complement logic 914, and normalization logic 550. Among the two data paths, the far path 1102 has a larger latency than close path 1104 so that the second half of the far path logic 1102 and the remaining logic (path select 1134, exponent adjust 310, and operation select logic 1138) comprise the critical path (indicated by the dashed arrow), which adds up to approximately 0.48 ns. The latencies of the two pipeline stages are fairly well balanced so that the throughput of pipelined, fused dual-path floating-point add-subtract unit 1100 is increased. Since the latency of the first pipeline stage is slightly larger than that of the second pipeline stage, it determines the throughput of the entire design.

In an example, embodiments of pipelined, fused dual-path floating-point add-subtract unit 1100 were implemented in Verilog-HDL and synthesized with the Nangate 45-nm technology standard-cell library. The functionality of the implementations was verified by performing a simulation with 1000 random input vectors. In order to evaluate the designs, the area, critical path latency, throughput, and power consumption were compared. Table IV shows the results for the four designs in single and double precision implementations.

TABLE IV

Fused Floating-Point Add-Subtract Design Comparison.

| | Discrete | Fused | Fused + Dual Path | Fused + Dual Path + Pipeline |
|---|---|---|---|---|
| Single precision | | | | |
| Area (µm$^2$) | 15,403 | 8,908 (58%) | 11,342 (74%) | 13,497 (88%) |
| Latency (ns) | 1.32 | 1.21 (92%) | 0.92 (70%) | 1.00 (76%) |
| Throughput (1/ns) | 0.76 | 0.83 (109%) | 1.09 (144%) | 1.92 (254%) |
| Power (mW) | 7.77 | 4.21 (54%) | 4.91 (63%) | 5.22 (67%) |
| Double Precision | | | | |
| Area (µm$^2$) | 34,606 | 18,534 (54%) | 23,430 (68%) | 27,586 (80%) |
| Latency (ns) | 1.66 | 1.52 (92%) | 1.12 (68%) | 1.22 (74%) |
| Throughput (1/ns) | 0.60 | 0.66 (109%) | 0.89 (148%) | 1.56 (259%) |
| Power (mW) | 15.46 | 8.17 (53%) | 9.03 (59%) | 10.58 (68%) |

Since the fused floating-point add-subtract unit shares much of the logic, it saves more than 40% of the area and power over the traditional discrete floating-point add-subtract unit. Also, the fused floating-point add-subtract unit performs only one sign and operation decision at the end of the entire logic, while the traditional floating-point adder requires sign and operation decision logic for each addition, subtraction and exponent adjustment. As a result, the fused floating-point add-subtract unit shows 8% less latency than the traditional discrete floating-point add-subtract unit.

The dual-path fused floating-point add-subtract unit 202 requires more area and power consumption than the fused floating-point add-subtract unit due to the three parallel additions, subtractions and LZAs for the close path (see, for example, additions 904, subtractions 906, and LZAs 546). However, the dual-path design reduces the latency by up to 30% as compared to a discrete implementation. The benefits of the proposed design are shown in both the single and double precision implementations. The double precision implementation requires about twice the area and power consumption of the single precision implementation due to the larger addition and subtraction logic. Since the addition and subtraction logic using the parallel prefix form logarithmically increases the latency, the latency for double precision increases by approximately 25%.

In an example, the fused floating-point add-subtract unit 400 saves approximately 40% of the area and power consumption compared to a discrete floating-point add-subtract unit. Further, the dual-path floating-point add-subtract unit 202 reduces the latency by approximately 30% compared to the discrete design with area and power consumption between that of the discrete and fused designs. In pipelined embodiments, the dual-path fused floating-point add-subtract unit 1100 can increase the throughput by as much as 75% compared to the non-pipelined dual-path design.

The pipelined fused floating-point add-subtract unit 1100 contains two stages, which include latches (not shown) as some data and control signals are passed from the first stage to the next. The comparison of the area, latency, throughput and power consumption of each pipeline stage are given in Table V.

TABLE V

Pipeline Stage Comparison.

| | Area (μm²) | Latency (ns) | Power (mW) |
|---|---|---|---|
| | Single Precision | | |
| Stage 1 | 7,852 (58%) | 0.52 (52%) | 2.94 (56%) |
| Stage 2 | 5,635 (42%) | 0.48 (48%) | 2.28 (44%) |
| | Double Precision | | |
| Stage 1 | 16,028 (58%) | 0.64 (52%) | 5.95 (56%) |
| Stage 2 | 11,557 (42%) | 0.58 (48%) | 4.63 (44%) |

Although the latches and control signals in the pipeline stages increase the total area, latency and power consumption, the throughput is increased by about 75% compared to the non-pipelined dual-path implementation.

In conjunction with the circuits and examples described above with respect to FIGS. 2 and 5-11, a dual-path fused floating-point add-subtract unit includes far path logic configured to produce sum and difference values for operands that have exponents that differ by more than one and a close path configured to produce sum and difference values for operands that are close in value. By sharing logic between the far path and the close path, circuit area is reduced and overall latency is decreased. By pipelining the far path and close path operations, overall throughput can be increased significantly.

Although the present invention has been described with reference to preferred embodiments, workers skilled in the art will recognize that changes may be made in form and detail without departing from the scope of the invention.

What is claimed is:

1. A fused floating-point add-subtract unit comprising:
far path logic configured to perform addition and subtraction operations on first and second significands of first and second operands, respectively, to produce a far path sum and a far path difference, wherein the far path logic includes:
significand swap, align and sticky logic configured to receive the first and second significands, align the significands, assign a guard bit, a round bit, and a sticky bit to a smaller significand, and provide a greater significand to a first output and the smaller significand to a second output;
add logic to produce a rounded sum and an unrounded sum of the greater significand and the smaller significand;
subtract logic to produce a rounded difference and an unrounded difference between the greater significand and the smaller significand;
round logic to receive at least a portion of the greater significand and the smaller significand and to determine a round up select signal; and
round selection logic configured to receive the rounded sum, the unrounded sum, the rounded difference, the unrounded difference, and the round up select signal, the round selection logic to selectively provide one of the rounded sum and unrounded sum and to selectively provide one of the rounded difference and the unrounded difference to first and second outputs, respectively;
close path logic configured to perform addition and subtraction operations on the first and second significands of the first and second operands, substantially concurrently with the addition and subtraction operations of the far path logic, to produce a close path sum and a close path difference; and
selection logic to selectively provide one of the far path sum and the close path sum as a significand of a sum output and one of the far path difference and the close path difference as a significand of a difference output.

2. The fused floating-point add-subtract unit of claim 1, wherein components of the far path logic and the close path logic are pipelined into a first stage and a second stage.

3. The fused floating-point add-subtract unit of claim 1, further comprising:
exponent compare logic configured to compare exponents of the first and second operands and to produce an exponent comparison output, an exponent difference output, and a far-close select output; and
wherein the selection logic comprises:
a first multiplexer including a first input to receive the far path sum, a second input to receive the close path sum, a control input to receive the far-close select output, and an output for providing a selected one of the far path sum and the close path sum in response to the far-close select output; and
a second multiplexer including a first input to receive the far path difference, a second input to receive the close path difference, a control input to receive the far-close select output, and an output for providing a selected one of the far path difference and the close path difference in response to the far-close select output.

4. The fused floating-point add-subtract unit of claim 1, wherein the far path logic further includes post normalization logic coupled to the first and second outputs of the round selection logic and including outputs for providing an addition significand and a subtraction significand.

5. The fused floating-point add-subtract unit of claim 1, wherein the close path logic comprises:
a small exponent compare including first and second inputs to receive two least significant bits of first and second exponents of the first and second operands and including an output for providing an exponent comparison signal;
small align logic configured to selectively align the significands of the first and second operands by one bit to produce first and second aligned significands;
addition logic including three addition units configured to add the first and second aligned significands to produce three sums;
subtraction logic including three subtraction units configured to subtract the first and second aligned significands to produce three differences;
leading zero anticipation (LZA) logic including three LZA units configured to provide three normalization shift signals;
a first multiplexer including inputs coupled to addition logic to receive the three sums, a control input to receive the exponent comparison signal, and an output to provide a selected one of the three sums in response to the exponent comparison signal;
a second multiplexer including inputs coupled to subtraction logic to receive the three differences, a control input to receive the exponent comparison signal, and an output to provide a selected one of the three differences in response to the exponent comparison signal; and
a third multiplexer including inputs coupled to LZA logic to receive the three normalization shift signals, a control input to receive the exponent comparison signal, and an output to provide a selected one of the three normalization shift signals in response to the exponent comparison signal.

6. A method comprising:
receiving first and second operands at a fused floating-point add-subtract circuit including close path logic and far path logic;
simultaneously performing add and subtract operations on the first and second operands using the far path logic to produce a far path sum and a far path difference and using the close path logic to produce a close path sum and a close path difference;
determining a difference between exponents of the first and second operands; and
selectively providing one of the far path sum and the close path sum to a first output and one of the far path difference and the close path difference to a second output in response to determining the difference;
wherein simultaneously performing the add and subtract operations on the first and second operands using the close path logic comprises:
  comparing least significant bits of first and second exponents of the first and second operands using small exponent comparison logic to produce an exponent compare output signal;
  adding first and second significands of the first and second operands using three parallel addition units to produce three sums;
  subtracting first and second significands of the first and second operands using three parallel subtraction units to produce three differences; and
  selecting between the three sums and the three differences using the exponent compare output signal to provide a selected sum and a selected difference to first and second outputs, respectively.

7. The method of claim 6, further comprising:
comparing exponent bits of the first operand to exponent bits of the second operand using exponent comparison logic of the fused floating-point add-subtract circuit;
providing an exponent comparison signal configured to identify a larger of the first and second operands to a first output; and
providing an exponent difference signal configured to identify a difference between the first and second operands to a second output.

8. The method of claim 6, wherein simultaneously performing the add and subtract operations on the first and second operands using the far path logic comprises:
providing a greater significand of the larger of the first and second operands to a first input of an addition unit, a first input of a subtraction unit, and a first input of a round unit in response to the exponent comparison signal;
providing a smaller significand of a smaller of the first and second operands to an input of an align unit;
shifting the smaller significand according to the exponent difference signal using the align unit to produce a first output including least significant bits and a second output including remaining bits including an aligned significand, a guard bit, and a round bit; and
performing an OR operation on the least significant bits to determine a sticky bit value and to append the sticky bit as the least significant bit of the remaining bits to produce a smaller significand with guard, round, and sticky bits.

9. The method of claim 8, further comprising:
performing an exclusive-or operation on sign bits of the first and second operands to produce an add-subtract selection bit of a sign logic unit;
providing the add-subtract selection bit to an output of the sign logic unit; and
generating the sign bit bits of addition and subtraction results using the sign logic unit for use by round logic in the far path logic.

10. The method of claim 9, wherein simultaneously performing the add and subtract operations on the first and second operands using the far path logic further comprises adding the greater significand and the smaller significand to produce a rounded sum and an unrounded sum;
subtracting the greater significand and the smaller significand to produce a rounded difference and an unrounded difference;
determining a round up selection based on the least significant bits of the greater significand, the smaller significand, and the add-subtract selection bit to produce a round up signal; and
selectively providing one of the rounded sum and the unrounded sum and one of the rounded difference and the unrounded difference to an output in response to the round up signal.

11. The method of claim 6, further comprising:
performing a complement operation on the selected difference using complement logic to produce a complemented signal;
normalizing the complemented signal to produce a normalized signal; and
performing post normalization operations on the selected sum and the normalized signal to produce an addition significand and a subtraction significand.

12. The method of claim 6, further comprising:
performing leading zero anticipation (LZA) operations on the first and second significands using three LZA units to produce three normalization shift outputs; and
selecting between the three normalization shift outputs based on the exponent compare output signal using a multiplexer to provide a selected normalization shift signal to a normalization shift output.

13. A fused floating-point add-subtract unit comprising:
exponent comparison logic to determine a difference between a first exponent of a first operand and a second exponent of a second operand;
far path logic configured to simultaneously perform add and subtract operations on the significands of the first and second operands to produce a far path sum and a far path difference when the difference is greater than one;
close path logic configured to simultaneously perform add and subtract operations on the significands of the first and second operands to produce a close path sum and a close path difference when the difference is less than or equal to one; and
selection logic circuitry coupled to the far path logic and the close path logic, the selection logic circuitry configured to selectively provide one of the far path sum and the close path sum as a significand of a sum output and one of the far path difference and the close path difference as a significand of a difference output; and
wherein the close path logic comprises:
  a small exponent compare including first and second inputs to receive two least significant bits of first and second exponents of the first and second operands and including an output for providing an exponent comparison signal;

small align logic configured to selectively align the significands of the first and second operands by one bit to produce first and second aligned significands;

addition logic including three addition units configured to add the first and second aligned significands to produce three sums;

subtraction logic including three subtraction units configured to subtract the first and second aligned significands to produce three differences;

leading zero anticipation (LZA) logic including three LZA units configured to provide three normalization shift signals;

a first multiplexer including inputs coupled to addition logic to receive the three sums, a control input to receive the exponent comparison signal, and an output to provide a selected one of the three sums in response to the exponent comparison signal;

a second multiplexer including inputs coupled to subtraction logic to receive the three differences, a control input to receive the exponent comparison signal, and an output to provide a selected one of the three differences in response to the exponent comparison signal; and a third multiplexer including inputs coupled to LZA logic to receive the three normalization shift signals, a control input to receive the exponent comparison signal, and an output to provide a selected one of the three normalization shift signals in response to the exponent comparison signal.

14. The fused floating-point add-subtract unit of claim 13, wherein the far path logic and the close path logic divided into two parallel pipeline stages comprising:

a first stage wherein:
the far path logic includes the exponent compare logic, significand swap logic, sign logic, and align and sticky logic;
the close path logic includes the exponent compare logic, significand align logic, add units, subtract units, leading zero anticipation units, and selection logic; and a second stage wherein:
the far path logic includes an add unit, a subtract unit, round logic, round and select logic, path select logic, exponent adjust logic, and operation selection logic; and
the close path logic includes second sign logic, complement logic, normalization logic, the path select logic, the exponent adjust logic, and the operation selection logic.

15. The fused floating-point add-subtract unit of claim 13, wherein the exponent comparison logic provides a far-close path selection signal.

16. The fused floating-point add-subtract unit of claim 15, wherein the selection logic circuitry comprises:
a first input to receive the far path sum;
a second input to receive the far path difference;
a third input to receive the close path sum;
a fourth input to receive the close path difference;
a control input for receiving the far-close path selection signal;
a first output for providing the selected one of the far path sum and the close path sum based on the far-close path selection signal; and
a second output for providing the selected one of the far path difference and the close path difference based on the far-close path selection signal.

17. The fused floating-point add-subtract unit of claim 13, wherein the far path logic comprises:
significand swap, align and sticky logic configured to receive the first and second significands, align the significands, assign a guard bit, a round bit, and a sticky bit to a smaller significand, and provide a greater significand to a first output and the smaller significand to a second output;
add logic to produce a rounded sum and an unrounded sum of the greater significand and the smaller significand;
subtract logic to produce a rounded difference and an unrounded difference between the greater significand and the smaller significand;
round logic to receive at least a portion of the greater significand and the smaller significand and to determine a round up select signal; and
round selection logic configured to receive the rounded sum, the unrounded sum, the rounded difference, the unrounded difference, and the round up select signal, the round selection logic to selectively provide one of the rounded sum and unrounded sum and to selectively provide one of the rounded difference and the unrounded difference to first and second outputs, respectively.

18. The fused floating-point add-subtract unit of claim 17, wherein the far path logic further includes post normalization logic coupled to the first and second outputs of the round selection logic and including outputs for providing an addition significand and a subtraction significand.

* * * * *